United States Patent Office 2,749,346
Patented June 5, 1956

2,749,346

TETRAHYDROPYRIDINE COMPOUNDS, THEIR SALTS AND QUATERNARY COMPOUNDS

Karl Hoffmann, Binningen, Eugen Tagmann, Basel, and Ernst Urech, Binningen, Switzerland, assignors to Ciba Pharmaceutical Products, Inc., Summit, N. J.

No Drawing. Application April 21, 1952, Serial No. 283,494

Claims priority, application Switzerland April 28, 1951

6 Claims. (Cl. 260—281)

This invention is for tetrahydropyridine compounds of the formula

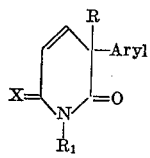

wherein X stands for oxygen or sulphur; aryl is e. g. a phenyl or naphthyl residue, which may be substituted, for example by alkyl groups, substituted oxy or amino groups or halogen atoms; R stands for an aryl or an alkyl residue, such as methyl or ethyl or an aminoalkyl group, in particular a dialkylamino or alkylene-imino group, such as a piperidino- or morpholino-alkyl group, and $R_1$ stands for hydrogen or an alkyl group, such as methyl, ethyl or propyl.

These new compounds have valuable pharmacological properties and can be used as medicaments. Thus, the compounds of the above formula, in which R is an aryl or alkyl residue—in particular the 3-phenyl-3-ethyl- 2,6-dioxo-1,2,3,6-tetrahydro-pyridine—are characterized by a pronounced anticonvulsive action. This effect was tested as against shocks produced in different ways in the mouse and in the rat. Both the electroshock and the shock produced with pentamethylene tetrazole were relieved with doses which are too small to produce general toxic symptoms. Spasms due to strychnine or sound irritation can also be suppressed. The compounds in which R represents an aminoalkyl residue, primarily the 3-phenyl-3-($\beta$-diethylamino - ethyl) - 2,6 - dioxo - 1,2,3,6 - tetrahydropyridine, have pronounced parasympathicolytic properties; the activity of the parasympathetic system is inhibited specifically with non-toxic doses.

The new tetrahydropyridine compounds are obtained by converting $\Delta^3$-2-aryl-pentene-1,5-diacids substituted in 2-position by an aryl, alkyl or amino-alkyl residue or functional derivatives thereof into their cyclic imides or thioimides whose ring nitrogen atom is unsubstituted or alkylated. Thus, in accordance with the invention the pentene diacid or functional derivatives thereof, such as their anhydrides or halides, may be reacted with ammonia or monoalkylamines.

To obtain the new compounds it is further possible to acylate intramolecularly the pentenediacid monoamides or their functional derivatives. In this procedure, the pentenediacid monoamides and their functional derivatives can also be formed in the course of the reaction. Thus, there may be used as starting material correspondingly substituted pentenediacid mononitriles which are treated with condensing agents, such as concentrated sulphuric acid, acetic anhydride, tin tetrachloride, furthermore titanium tetrachloride, or boron trifluoride etherates, zinc chloride, aluminium chloride or mixtures thereof. Furthermore, it is possible to convert e. g. the pentenediacid diamides or pentenediacid diammonium salts into the cyclic imides by heating.

A further modification of the process consists in taking a compound of the formula

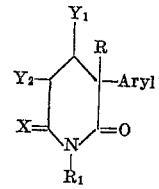

wherein $R_1$, X, aryl and R have the aforementioned significance, and one of the two residues $Y_1$ and $Y_2$ is hydrogen and the other a residue capable of being split off with the formation of a double bond, and splitting off such substituents. Thus, for example, by splitting off hydrogen halide from correspondingly 3-substituted 2,6-dioxo-4- or 5-halogenpiperidines the desired 2,6-dioxo-tetrahydropyridine compounds can be obtained. Furthermore, the corresponding 4- or 5-oxy- or acyloxy-2,6-dioxo-piperidines there can be obtained by splitting off water or acid the tetrahydropyridine derivatives. The necessary starting materials can be made by methods in themselves known.

Tetrahydropyridines obtained by the process of this invention which are not substituted at the ring nitrogen atom can be subsequently substituted in 1-position, as by reacting them with reactive esters of alcohols with aliphatic diazo compounds, in particular diazomethane or reactive acid derivatives, such as acid halides or acid anhydrides. Reactive esters of alcohols are primarily those of strong organic or inorganic acids, such as of hydrohalic acid or organic sulphonic acids, such as hydrochloric acid or para-toluene-sulphonic acid. The said subsequent substitution is preferably conducted in the presence of condensing agents capable of forming metal compounds with the di-oxo-tetrahydropyridines, such as alkali metals or alkaline earth metals, e. g. sodium, lithium, calcium, their amides, hydrides, hydrocarbon compounds or alcoholates, e. g. sodium amide, sodium hydride, butyl lithium, phenyl potassium, phenyl lithium, potassium tertiary butylate or potassium tertiary amylate.

Compounds of the formula indicated on page 1, wherein X stands for sulphur, are also obtained when in 2,6-dioxo-1,2,3,6-tetrahydro-pyridines obtained according to this invention an oxygen atom is replaced by sulphur. Thus, e. g. 2,6-dioxo-1,2,3,6-tetrahydropyridines may be treated with phosphorus pentasulphide at a raised temperature in the presence or absence of a solvent.

When according to the present process compounds are obtained which carry a basic group, salts thereof with inorganic or organic acids can be obtained, such as of hydrohalic acid, sulphuric acid, phosphoric acid, acetic acid, oxalic acid, citric acid, methane sulphonic acid, benzoic acid, para-aminosalicylic acid or toluene sulphonic acid. From the said tetrahydropyridine compounds with a basic group, quaternary derivatives can also be obtained. Thus it is possible to react them with reactive esters of alcohols, in particular of hydrohalic acids, sulphuric acid or organic sulphonic acids, such as alkyl-halides, dialkylsulphates or toluenesulphonic acid esters.

The following examples illustrate the invention, the parts being by weight unless otherwise stated and the relationship of parts by weight to parts by volume being the same as that of the gram to the cubic centimetre:

Example 1

16.0 parts of 2,2-diphenylpentene-1,5-diacid-1-mononitrile are dissolved in 30 parts by volume of glacial acetic acid and 20 parts by volume of concentrated sulphuric acid are added in portions at an initial temperature of 40–50° C. The reaction is exothermic and the temperature of the reaction mixture rises to about 80° C.

Finally the reaction mixture is maintained for a short time at a temperature of 100–110° C. After cooling the whole is poured on to ice, neutralised with caustic soda solution to a pH value of 7, the whole is extracted with ethyl acetate, the ethyl acetate solution is washed with dilute sodium carbonate solution, washed with water, dried over calcium chloride, the solvent is evaporated, and the residue is recrystallised from acetone with the addition of ligroin. The resulting 3,3-diphenyl-2,6-dioxo-1,2,3,6-tetrahydropyridine melts at 170–172° C. It has the formula

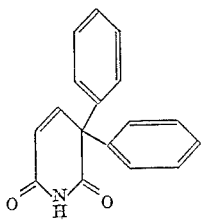

The 2,2-diphenylpentene-1,5-diacid-1-mononitrile used as starting material in this example can be prepared for example as follows:

16.0 parts of diphenyl-acetonitrile are dissolved in 100 parts by volume of dioxane and 8.0 parts of propiolic acid ethyl ester are added in portions. At the same time 5 parts by volume of an aqueous solution of 40 per cent strength of trimethyl-benzyl-ammonium hydroxide are added. The temperature of the reaction mixture is maintained at 50–70° C. When the reaction has finished the whole is maintained at 70–80° C. for a further 2 hours. After cooling the whole is neutralised with dilute hydrochloric acid, mixed with water, and the whole is extracted with ether, the ethereal solution is washed with water, dried over sodium sulphate, the solvent is evaporated, and the residue is distilled under a high vacuum. The resulting 2,2-diphenyl-1,5-pentene-diacid-5-monomethyl ester-1-mononitrile distills at 178–184° C. under a pressure of 0.5 mm.

From the 2,2-diphenyl-1,5-pentene-diacid-5-monoethyl ester-1-mononitrile there is obtained, for example, by hydrolysis with a methyl alcoholic solution of caustic potash, 2 - 2 - diphenyl-pentene-1,5-diacid-1-mononitrile, which melts at 132–135° C. after recrystallisation from a mixture of acetone and ligroin.

*Example 2*

21.5 parts of 2-ethyl-2-phenyl-pentene-1,5-diacid-1-mononitrile, dissolved in 25 parts by volume of glacial acetic acid are, after the addition of 10.0 parts of ammonium sulphate, mixed in portions with 25 parts by volume of concentrated sulphuric acid, the temperature rising to about 80° C. The mixture is heated on the boiling water bath for 2 hours and after cooling it is poured onto ice. The resultant compound precipitates in powdery form. After working up as shown in Example 1 and recrystallisation from alcohol there is obtained the 3-ethyl-3-phenyl-2,6-dioxo-1,2,3,6-tetrahydropyridine of the formula

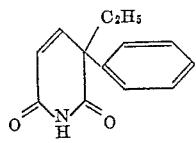

in the form of colourless crystals of melting point 164–166° C.

When this compound is treated with methyl iodide in the presence of sodamide as condensing agent and, e. g. toluene as solvent there is obtained at an elevated temperature the 1-methyl-3-ethyl-3-phenyl-2,6-dioxo-1,2,3,6-tetrahydro-pyridine.

The 2-ethyl-2-phenyl-pentene-1,5-diacid-1-mononitrile used as starting material can be prepared e. g. as follows:

At 45–55° C., 109.0 parts of α-ethyl-benzylcyanide are mixed in portions with 73.5 parts of propiolic acid ethyl ester with an addition of triethylamine and trimethyl-benzyl-ammonium hydroxide. The temperature is then maintained at 75° C. for two hours. After cooling, the reaction mass is neutralised with dilute hydrochloric acid, taken up in ether, and the ethereal solution washed with water, dried over sodium sulphate, and the solvent evaporated and the residue distilled. The 2 - ethyl - 2 - phenyl - pentene - 1,5 - diacid - 1 - mononitrile-5-monoethyl ester distills at 182–190° C. under a pressure of 9 mm. From it there is obtained by hydrolysis with potassium carbonate in methanol the 2-ethyl-2-phenyl-pentene-1,5-diacid-1-mononitrile in the form of an oil which is not purified before being worked up further.

*Example 3*

A mixture of 32.2 parts of 2-(β-diethylaminoethyl)-2-phenyl - pentene - 1,5 - diacid - 1 - mononitrile-monohydrochloride and 48 parts by volume of glacial acetic acid is mixed in portions with 48 parts by volume of concentrated sulphuric acid, the temperature rising to about 80° C. By heating in an oil bath, the temperature is maintained between 100 and 125° C. for 20 minutes. After cooling, the reaction mixture is poured on to ice, neutralised with a solution of sodium carbonate, and extracted with ether. The ethereal extract, after being washed with water, is dried over solid sodium carbonate, the solvent distilled off, and the residue distilled. The resultant 3-(β-diethylaminoethyl)-3-phenyl-2,6-dioxo-1,2,3,6-tetrahydropyridine of the formula

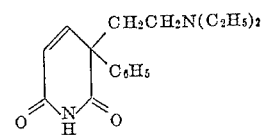

distills between 172–185° C. under 0.22 mm.

By treatment with one equivalent of hydrochloric acid in alcohol there is obtained the monohydrochloride which melts at 225–227° C.

The 2 - (β - diethylaminoethyl) - 2 - phenyl - pentene-1,5-diacid-1-mononitrile-monohydrochloride used as starting material can be prepared e. g. in the following way:

At 55–70° C. 21.6 parts of α-(diethylamino-ethyl)-benzylcyanide, dissolved in dioxane are mixed with 9.8 parts of propiolic acid ethyl ester in the presence of trimethyl-benzyl-ammonium hydroxide. The reaction mixture is maintained at 70–80° C. for two hours and the solution then concentrated by evaporation, mixed with ether, and washed with water. After drying the ethereal solution over potassium carbonate and distilling off the solvent, the resultant 2-(β-diethylaminoethyl)-2-phenyl-pentene-1,5-diacid-1-mononitrile-5-ethylester is distilled at 150–160° C. under 0.27 mm. pressure. By hydrolysis with 17% hydrochloric acid on the boiling water bath there is obtained the 2-(β-diethylaminoethyl)-2-phenyl-pentene-1,5-diacid-1-mononitrile-monohydrochloride.

*Example 4*

21.5 parts of 3-ethyl-3-phenyl-2,6-dioxo-1,2,3,6-tetrahydropyridine are boiled under reflux for 2–3 hours with 26.0 parts of phosphorus pentasulphide in 200 parts by volume of pyridine. The solvent is then distilled off and the residue treated with water and ether. The ethereal solution is dried over calcium chloride, filtered and evaporated. The residual material is recrystallized from iso-propyl-ether to obtain the 3-ethyl-3-phenyl-2- oxo-6-thioketo-1,2,3,6-tetrahydropyridine as orange-coloured crystals of the formula

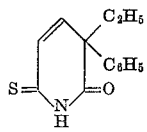

and melting at 105–107° C.

*Example 5*

3.0 parts of 2,6-dioxo-3-ethyl-3-phenylbromopiperidine are refluxed with 10.0 parts by volume of collidine for 30 to 60 minutes in an oil bath of 150° C. The collidine is then distilled off under reduced pressure and the residue dissolved in ethyl acetate and water. The ethyl acetate solution is dried, filtered and concentrated to a small volume and then caused to crystallize. The crystals melt at 164–166° C. and are identical with those of Example 2.

The 2,6-dioxo-3-ethyl-3-phenyl-bromopiperidine of melting point 164–166° C. can be prepared by brominating 2,6-dioxo-3-ethyl-3-phenyl-piperidine with bromine in the presence of light.

What is claimed is:

1. A tetrahydro-pyridine compound selected from the group consisting of compounds of the formula

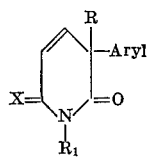

and their addition salts, in which formula Aryl is a phenyl group, X is a member selected from the group consisting of oxygen and sulphur, R is a member selected from the group consisting of phenyl, lower alkyl, di-lower alkyl-aminoalkyl and lower alkylene-aminoalkyl groups, and $R_1$ stands for a member selected from the group consisting of hydrogen and lower alkyl.

2. A 3 - phenyl - 3 alkyl - 2,6 - dioxo - 1,2,3,6 - tetra - hydro - pyridine, the alkyl being lower alkyl.

3. 3 - phenyl - 3 - ethyl - 2,6 - dioxo - 1,2,3,6 - tetra - hydro - pyridine.

4. A 3 - phenyl - 3 - aminoalkyl - 2,6 - dioxo - 1,2,3,6 - tetrahydro - pyridine, the aminoalkyl being di-lower alkyl-aminoalkyl.

5. A 3 - phenyl - 3 - dialkylaminoalkyl - 2,6 - dioxo - 1,2,3,6 - tetrahydro-pyridine, the alkyl groups being lower alkyl.

6. 3 - phenyl 3 - ($\beta$ - diethylamino - ethyl) - 2,6 - di - oxo - 1,2,3,6 - tetrahydro-pyridine.

References Cited in the file of this patent

Beilstein's Handbuch der Organischen Chemie Vierte Auflage, 1935, Band XX/XXII, p. 408.